Nov. 5, 1929.  I. PICK  1,734,826
MANUFACTURE OF PARTITION AND LIKE BUILDING BLOCKS
Filed Sept. 26, 1925
Fig. 1.
Fig. 2. 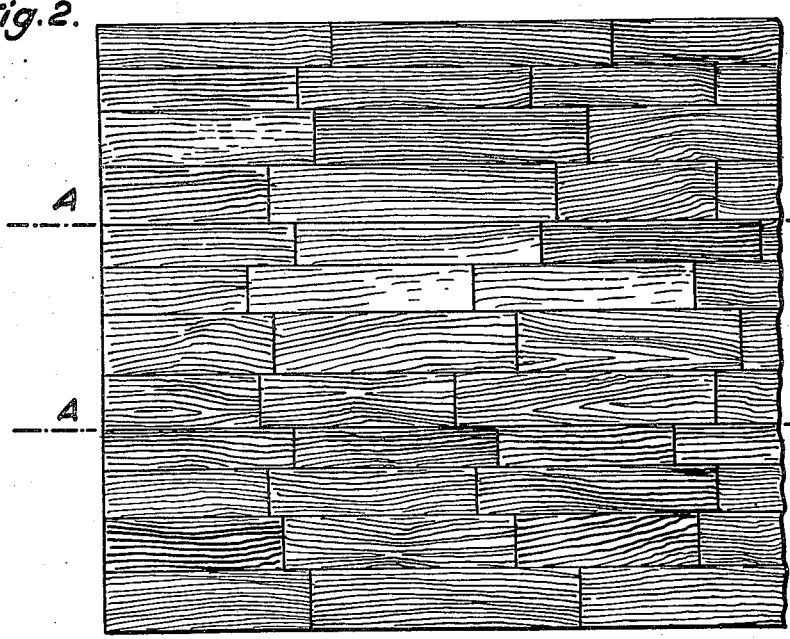 Fig. 3. 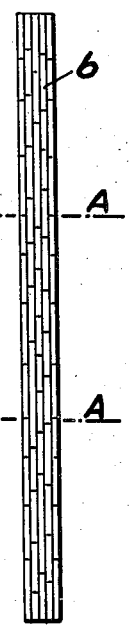

Inventor
I. Pick
by Langner, Parry, Card & Langner
Attys.

Patented Nov. 5, 1929

1,734,826

UNITED STATES PATENT OFFICE

ISRAEL PICK, OF KONIGSBERG, GERMANY

MANUFACTURE OF PARTITION AND LIKE BUILDING BLOCKS

Application filed September 26, 1925, Serial No. 58,700½, and in Germany October 9, 1929.

This invention relates to a novel form of partition or building block and to the method of producing the same, the object being to provide a high quality of block capable of withstanding great loads and stresses and at the same time being highly resistant to the weather, and a good heat insulator.

It is known to form partition blocks or panels by building up blocks of boards glued together and cut from the block at right angles to the age rings, whereupon these blocks are again cut in a plane at right angles to the plane of the boards, and are formed into panels or partition blocks by gluing veneer boards on the outer faces.

According to the invention, a partition block of greater strength and resisting power both for loads and weathering is obtained, even when inferior materials are used in making up the block.

In planing and making veneer boards and the like, a large quantity of waste occurs which can only be used for packing, firing or similar purposes. According to this invention, said waste veneers shavings and the like are so massed together and treated as to form valuable building blocks suitable for partitions or panels.

The invention will be more readily understood from the following description, reference being had to the accompanying drawings in which:—

Figure 1 is an end elevation of a board made up of waste veneer glued together with their grains running parallel, according to the first stage of the improved process.

Figure 2 is a plan view of the block or board shown in Figure 1.

Figure 3 is an end elevation at right angles to that shown in Figure 1.

In carrying the invention into effect, pieces a of waste veneers or shavings of various sizes as shown in Figures 1–3 are set together and glued, so that no two edge joints in any plane register, somewhat after the manner in which ship's decks are laid. An examination of the joints shown in Figures 1–3 will explain what is meant by the term that no two edge joints are in register. The joints forming the plane surfaces of the boards may however be in register, as can be seen in Figures 1 and 3, where a board made up of five layers of veneers is illustrated. The board may be made up of any suitable number of superposed veneer bricks or plates glued together, and its finished size may conveniently be about 1.50 metres long, 1.20 metres broad and about 60 millimetres thick. The layers are glued together under pressure, preferably in a hydraulic press.

Figure 4:
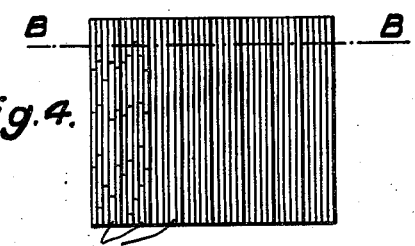
Figure 4 illustrates the second stage in the process of making blocks from the boards as shown in Figures 1 to 3.

The board made up as described is now cut in sections $b$, as for instance at the lines A—A of Figures 2 and 3, and these sections $b$ are again placed side by side and glued together to form a block, as shown in Figure 4. The sections $b$ are conveniently superposed until the height of the block is about .50 metres, and the gluing of the sections $b$ is again effected under high pressure.

The block in Figure 4 is now cut in a suitable band saw or the like in sections indicated by the plane B—B in Figure 4, whereby a board or block is produced composed of veneers glued together and arranged in a plane at right angles to the plane of the block or board, but the grain of the veneers runs perpendicular to the plane of the block or board.

Figure 5:
Figure 5 is an end elevation of the finished partition block or building panel, according to this invention.

The core block produced in this manner may be of any desired thickness and may be used to form panels or blocks of any desired size, as for instance 1.50 metres, by placing the core sections side by side as shown in Figure 5 and gluing veneers thereon on each side. The direction of the grain in the outer veneers is arranged at right angles to the direction of the grain in the veneer pieces which constitute the core piece of the finished block.

In this way waste shavings and veneering can be effectively used to produce a high quality partition block or panel. It is not necessary however to use waste material, as it is evident that the veneers forming the core of the block may be specially cut and shaped, or may be cut from parts of the block not suited for ordinary veneer boards. In practice, the resulting block has proved exceedingly strong and resistant to the effects of the weather as well as to warping, and forms a high quality partition block or panel.

I claim:—

1. A process of forming compact building blocks and panels, consisting in forming boards from waste veneers by placing the same together and joinig them in staggered relation by gluing under pressure, cutting the boards so formed into sections, placing the sections side by side and gluing them together, then cutting core sections from the block so formed and gluing veneer boards to the opposite faces of said cores in such a manner, that the grain of the veneer facing boards is transverse to the grain of the veneer sections of which the core is composed.

2. As an article of manufacture a compact building block or panel, comprising waste veneer pieces and produced by placing such pieces together and joinig them in staggered relation by gluing under pressure, cutting the boards so formed into sections, placing the sections side by side and gluing them together, then cutting core sections from the block so formed and gluing veneer boards to the opposite faces of said cores in such a manner, that the grain of the veneer facing boards is transverse to the grain of the veneer sections of which the core is composed.

In testimony wherof I have signed my name to this specification.

ISRAEL PICK.